Aug. 1, 1933.  S. P. MILLER  1,920,267
DISTILLATION OF TAR, ETC
Filed March 2, 1927  11 Sheets-Sheet 3
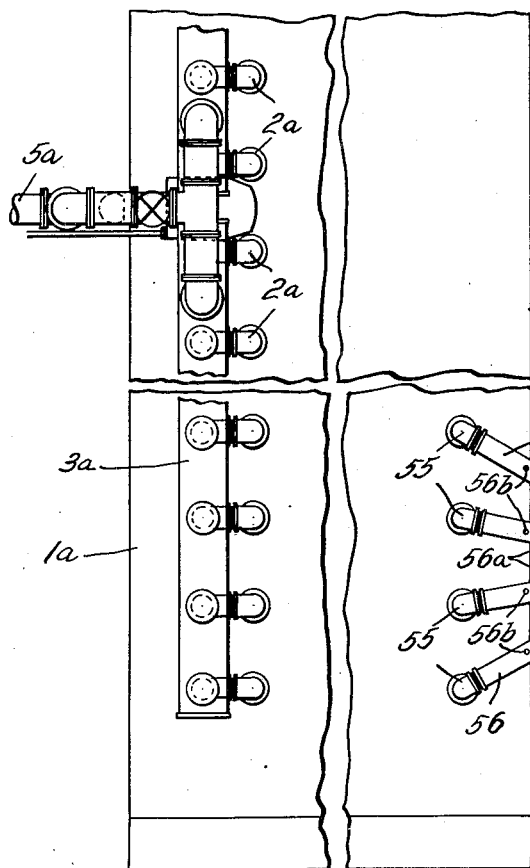
Fig. 3.
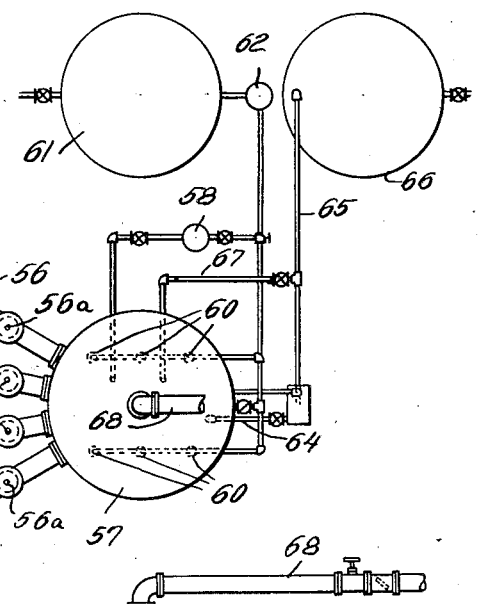
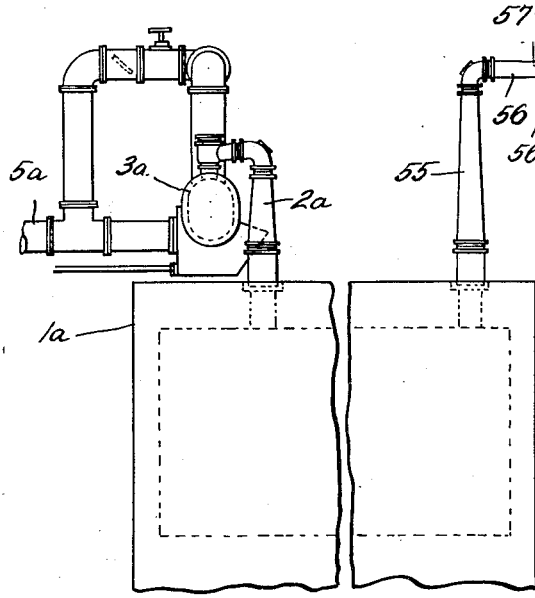
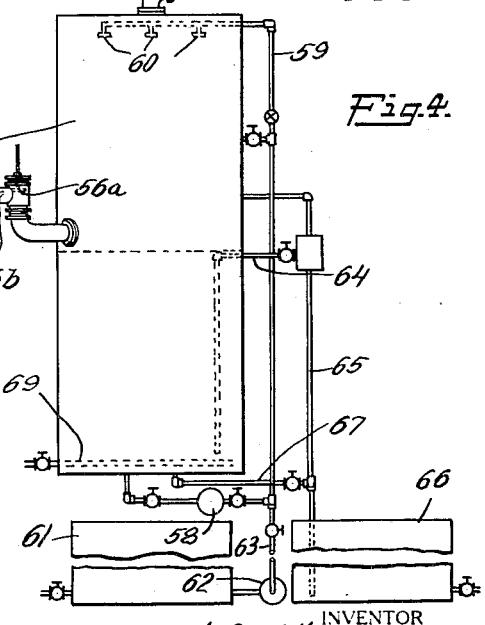
Fig. 4.
INVENTOR
Stuart P. Miller
BY
Pennie Davis Marvin Edmonds
ATTORNEYS Aug. 1, 1933.　　　　S. P. MILLER　　　　1,920,267
DISTILLATION OF TAR, ETC
Filed March 2, 1927　　　11 Sheets-Sheet 4
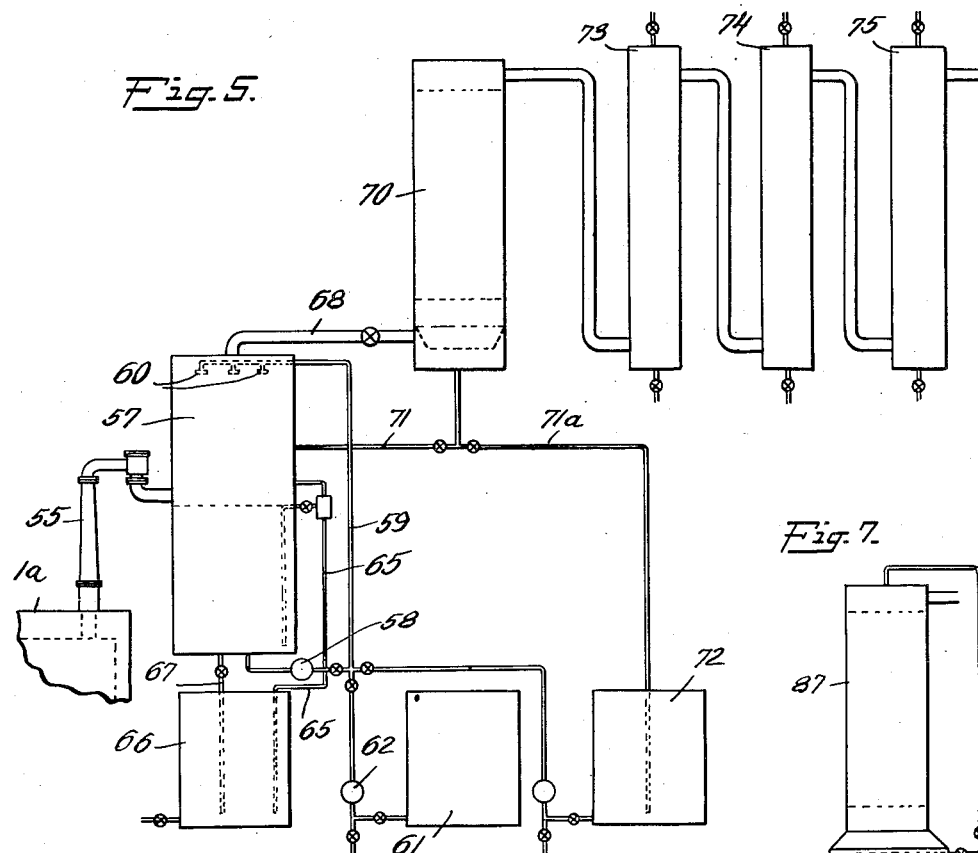
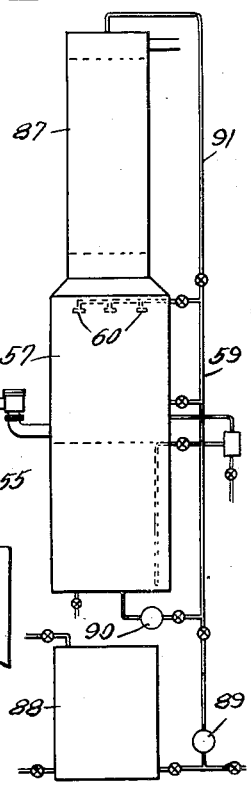
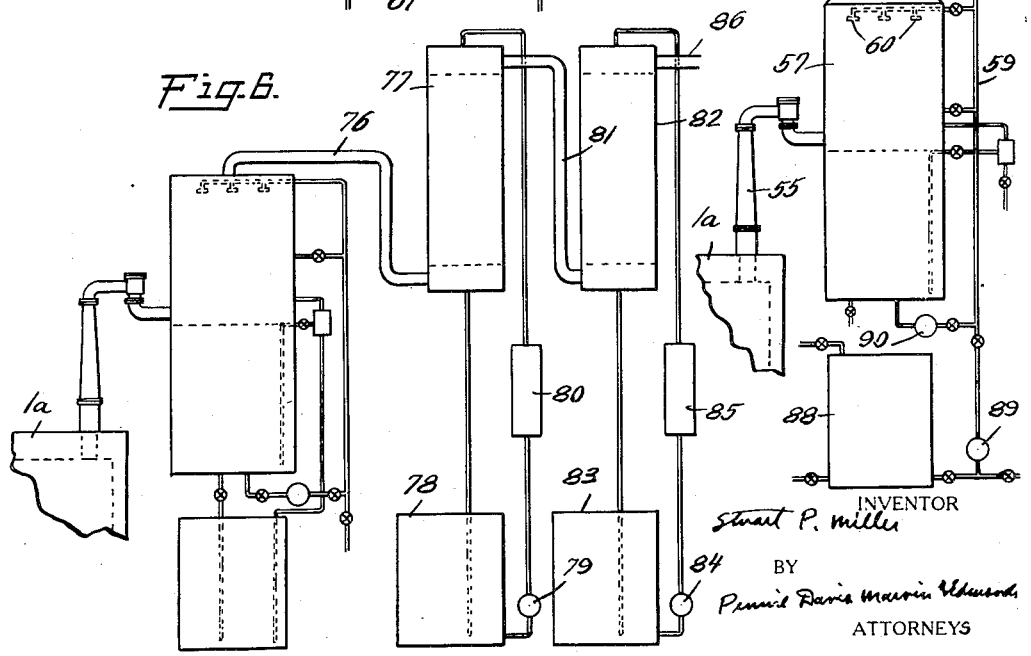

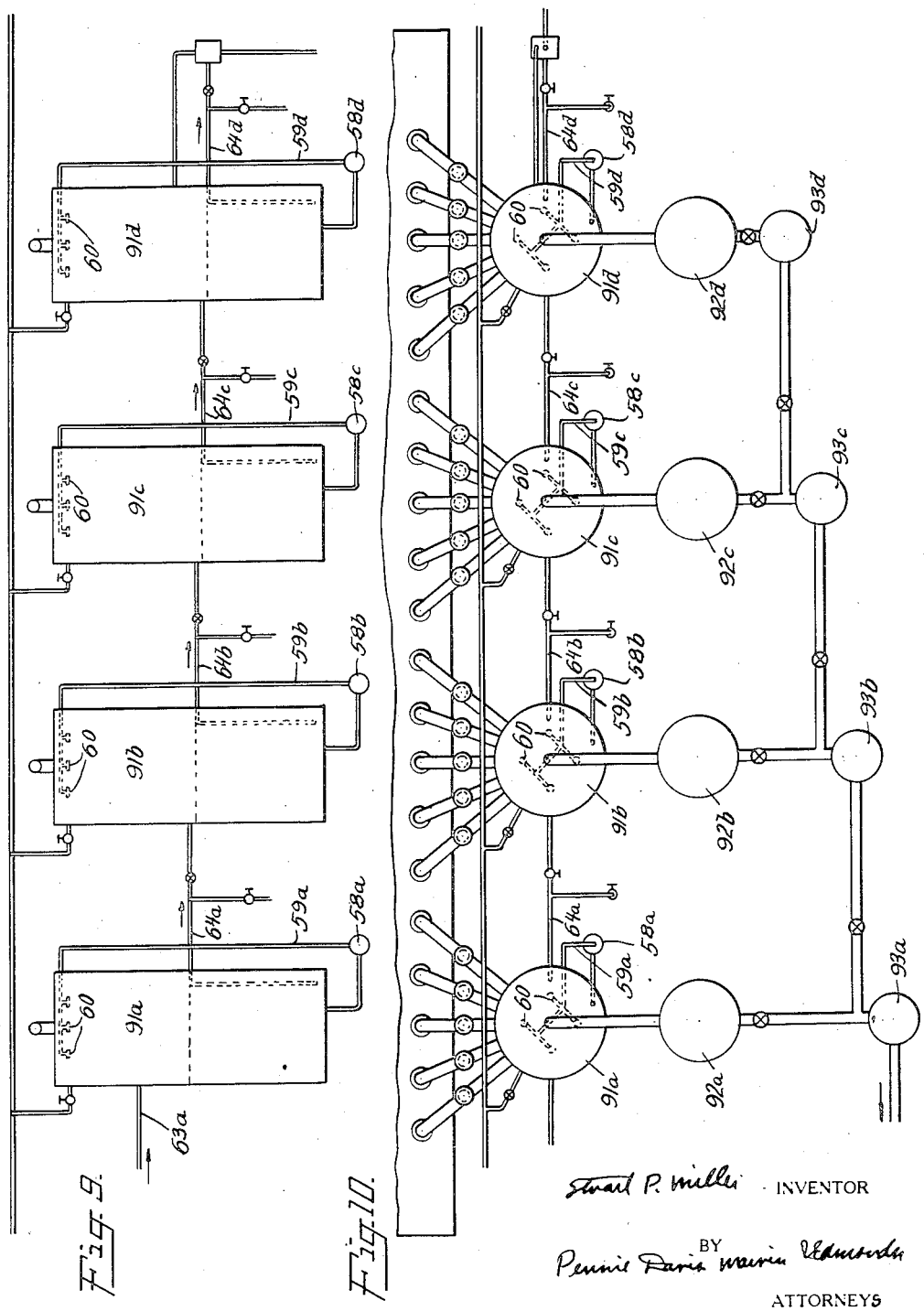

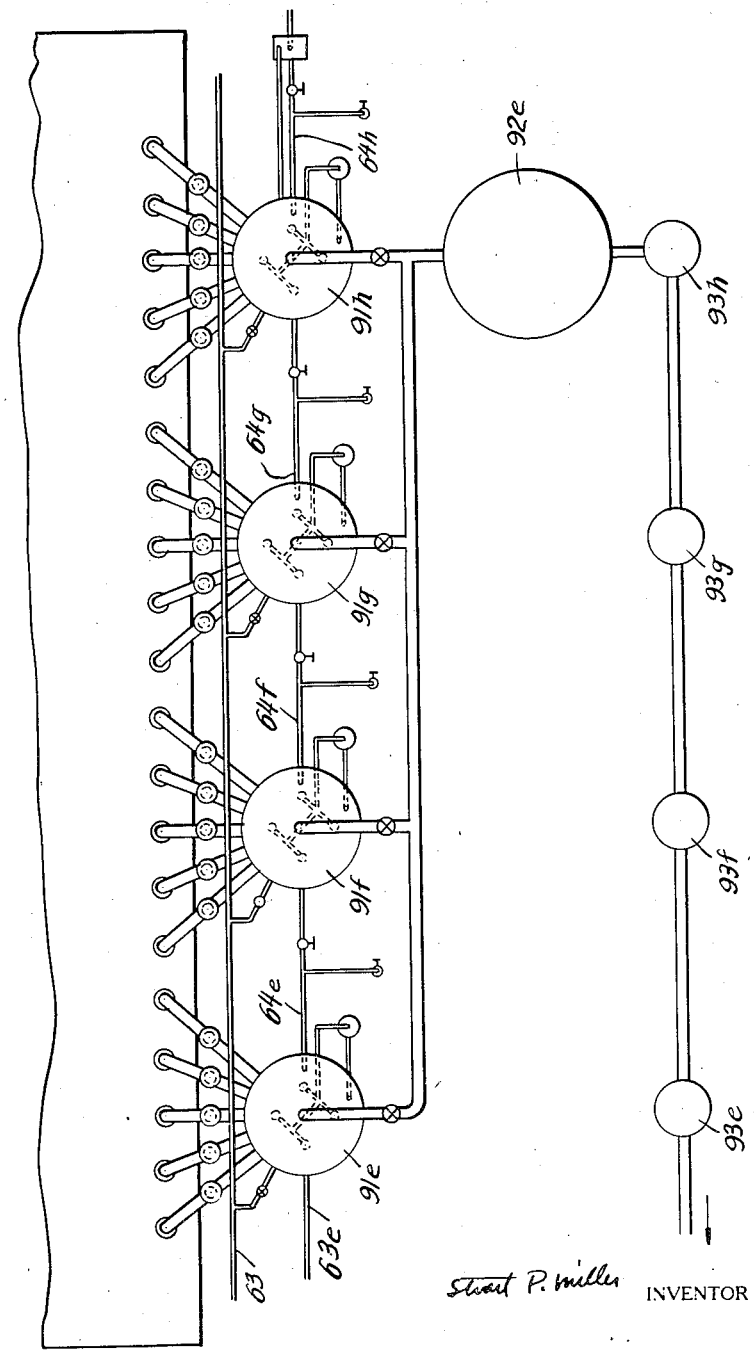

Aug. 1, 1933.   S. P. MILLER   1,920,267
DISTILLATION OF TAR, ETC
Filed March 2, 1927   11 Sheets-Sheet 8

Stuart P. Miller   INVENTOR

BY Pennie Davis Marvin & Edmonds
ATTORNEYS

Aug. 1, 1933.  S. P. MILLER  1,920,267
DISTILLATION OF TAR, ETC
Filed March 2, 1927   11 Sheets-Sheet 9
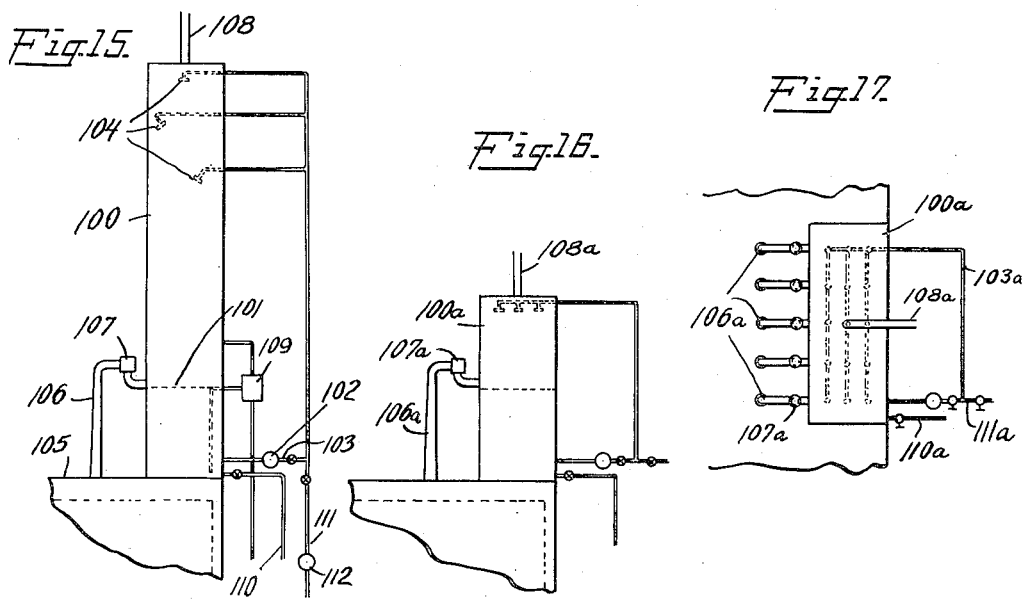
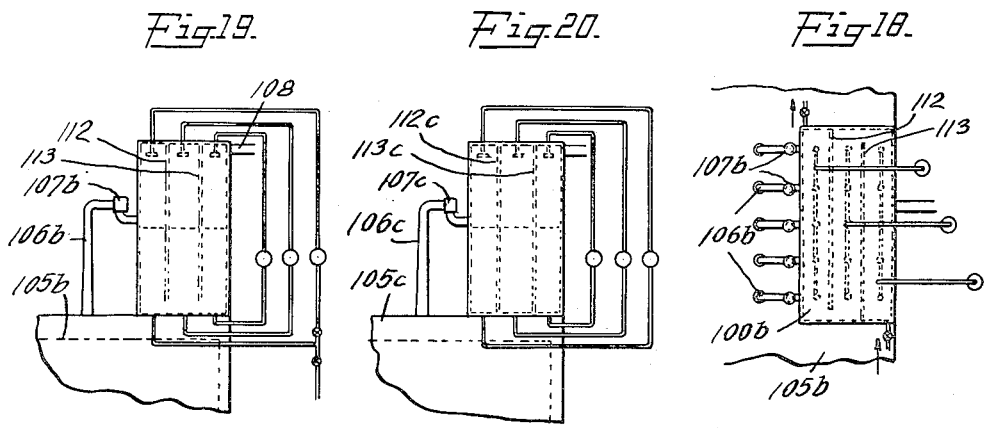

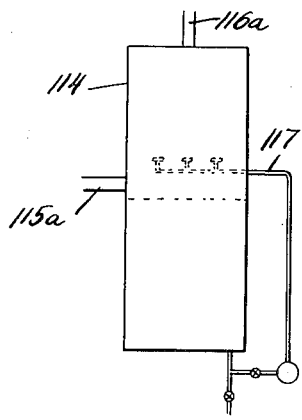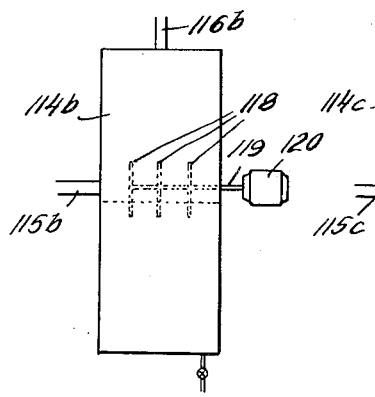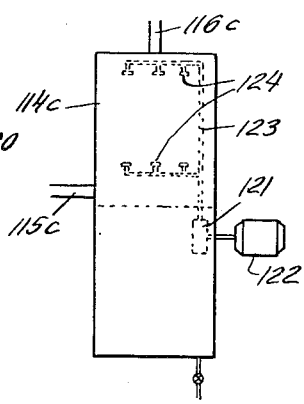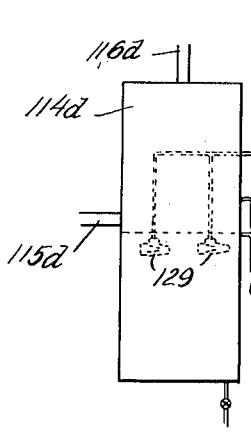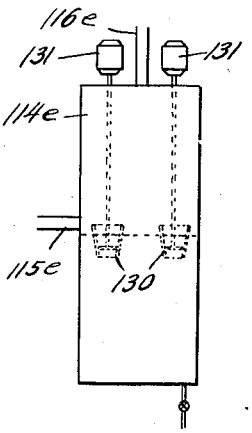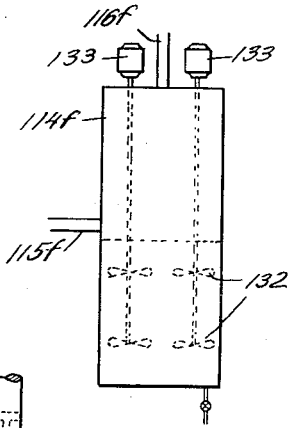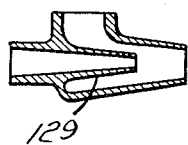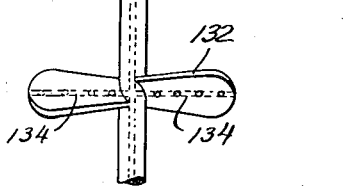

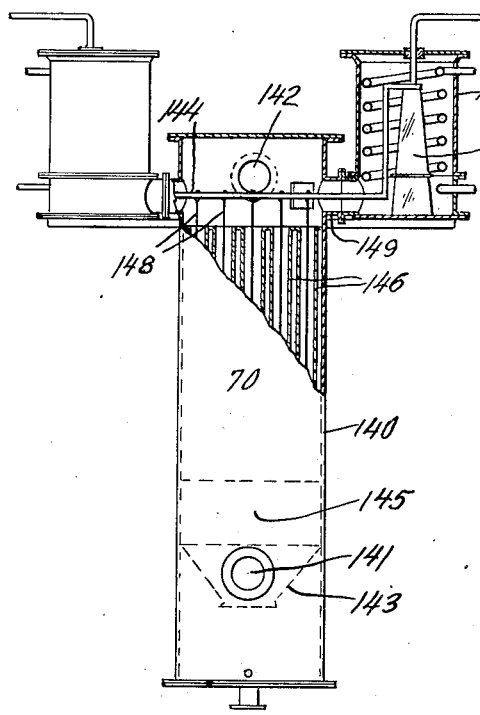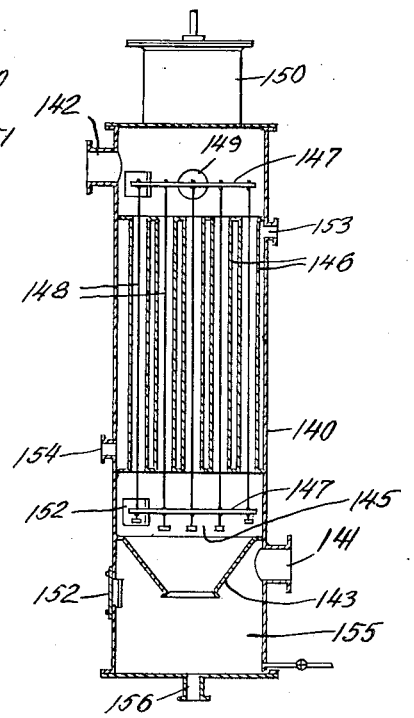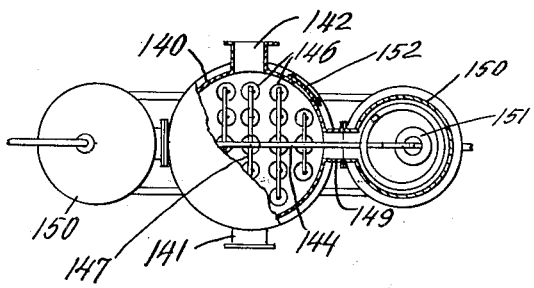

Patented Aug. 1, 1933

1,920,267

UNITED STATES PATENT OFFICE 1,920,267

DISTILLATION OF TAR, ETC.

Stuart Parmelee Miller, Tenafly, N. J., assignor to The Barrett Company, New York, N. Y., a Corporation of New Jersey Application March 2, 1927. Serial No. 171,955

18 Claims. (Cl. 202—30.)

This invention relates to improvements in the distillation of tars and oils and the production of distillate oils and pitches etc. therefrom. The invention includes a new method of distillation and an improved apparatus therefor. More particularly, the invention relates to improvements in the distillation of coal tar and the production of pitches and distillate oils at coal distillation plants, such as by-product coke ovens.

In the ordinary operation of by-product coke ovens the gases produced by the coking operation pass from the individual ovens through individual uptake pipes and goosenecks to a collector main or mains common to a battery of ovens. The coke oven gases leaving the ovens at a high temperature are cooled to separate tar constituents therefrom, the tar constituents being separated partly in the collector and crossover mains and partly in subsequent condensers.

Coal tar produced at by-product coke ovens is commonly shipped or conveyed to tar distillation plants where it is subjected to distillation for the recovery of coal tar distillates and the production of pitches as residues of the distillation.

The present invention provides an improved process of and apparatus for tar distillation in which the tar is distilled directly at the by-product coke oven plants without the need of a separate tar distillation plant and without transportation expense, and with the production from the tar of distilled oils and of pitches as residues from the distillation.

According to the present invention, the distillation of tar is effected by hot coke oven gases which are caused to pass through the vapor space of a still or tank containing a large body of tar and the tar is brought into intimate contact with the hot gases, as by atomizing or showering the tar through the vapor space of the still through which the hot gases are passing. The hot coke oven gases are employed for the distillation while they are at a high temperature shortly after they leave the coke ovens or while they are still at a sufficiently high temperature to accomplish the desired distillation.

In carrying out the invention, a large body of the tar or oil to be distilled is provided in a still or tank having a relatively large vapor space above the body of tar. The tar or oil is circulated and showered or sprayed into the vapor space to bring it into intimate contact with gases therein, and the hot coke oven gases are passed through the vapor space of the still in intimate contact with the finely divided tar sprayed or otherwise distributed therein. The continued circulation of the tar and bringing it into contact with the hot gases results in distillation of the tar which may be carried to the point of producing pitch of desired melting point. The distillation of the tar also drives off oils from the tar which can be subsequently condensed and recovered. The hot coke oven gases will themselves be somewhat scrubbed and cleaned by the tar with which they are brought in contact, and more or less of the heavier tar constituents will be separated therefrom and combined with the tar body in the still. The product of the distillation will comprise the coke oven gases after they have been cleaned, and the admixed vapors from the distillation.

The carrying out of the distillation process may be either intermittent or continuous. In the batch or intermittent process, a charge of tar to be distilled is placed in the still and is circulated and sprayed into or otherwise brought into intimate contact with the gases in the vapor space of the still while the hot coke oven gases are passed therethrough; and this circulation and distillation are continued until the tar has been distilled to the desired extent and the pitch or heavy tar residue produced. By continuing the distillation it is possible to produce pitch of high melting point, while by regulating the distillation and stopping it before the distillation has proceeded so far, it is possible to produce heavy tar products or pitches of low melting point. The character of the vapors driven off from the tar will vary with the nature of the tar and the extent of the distillation. In the batch operation, the vapors will tend to become progressively heavier, and by fractionally condensing the vapors, distillate oils of correspondingly varying characteristics can be obtained.

Instead of operating on a batch or charge of tar, additional tar can be supplied to the still during the distillation to compensate for the oils which are distilled so as to maintain a substantially constant volume of tar or pitch in the still. By introducing tar in this way during the distillation, a considerably increased amount of oils can be produced and also an increased amount of pitch residue.

Instead of operating intermittently with successive batches of tar, the process can advantageously be made continuous by a continuous introduction of additional tar and by continuously withdrawing the pitch residue after it has reached the desired degree of hardness. Circulation of the body of tar during distillation is advantageous in that it promotes uniformity of composition of the body of tar and uniformity of distillation of oils therefrom.

In order that the distillation may be effectively carried out with hot coke oven gases, the still is located in close proximity to the coke oven. It may be located, for example, on top of the coke oven battery in close proximity to the uptake pipes or gas collecting main so that the hot gases may be discharged while still at high temperature into the still. The still may also be located at the side or end of the battery or at a sufficiently close location so that the gases will reach the still at a high temperature. Insulated pipes can be used for preventing undue cooling of the gases between the coke ovens and the still.

The ordinary coke oven battery is provided with individual uptake pipes leading from the individual ovens to a collector main common to several ovens. The gases used in the process of the present invention may be taken from one or more of the uptake pipes or from the collector main; or separate gas connecting pipes, such as separate uptake pipes, may be provided from a sufficient number of the ovens to the still to insure a sufficient volume of hot coke oven gases for the desired distillation.

In the ordinary coke oven operation, the gases entering the collector main are sprayed with ammonia liquor or tar or both for the purpose of cooling the gases before they pass over through the cross-over main to the coolers or condensers. The utilization of part or all of the hot coke oven gases for distilling tar, etc., in accordance with the present invention, may involve a replacement of part of the collector main system or of all of it; or the present invention may be employed together with the ordinary collector main and gas collecting system, and a sufficient amount of the hot coke oven gases diverted therefrom for use in the tar distillation process of the invention.

The distillation of the tar can be carried out in a single still or in a series of stills, and, where a plurality of stills is employed, the stills may be operated in parallel or in series; that is, a plurality of stills can be employed independently, each provided with its supply of hot coke oven gases for the distillation; or a series of stills can be used through which the tar is progressively circulated in series, or through which the hot coke oven gases are passed in series, or through which both the tar and the hot coke oven gases are passed in series, for example, countercurrent to each other. Where the tar is passed through several stills in series, the gases need not be passed through the stills countercurrent, but the flow of gases through the stills may be in parallel, that is, hot coke oven gases may be taken directly from the coke oven battery to the individual stills.

By operating a series of stills, it is possible to produce tar products and pitches of different properties and melting points simultaneously, and also to produce distillate oils of varying characteristics simultaneously from the different stills.

The tar to be distilled can be brought into intimate contact with the hot gases in various ways. The tar can, for example, be circulated from the large body of tar through atomizing or spraying devices and atomized or sprayed or showered through the vapor space of the still and thereby brought into intimate contact with the hot gases passing through the still. By continually circulating the tar in this way, it is progressively heated and distilled until the distillation is carried to the desired extent. In the batch operation, the distillation will be discontinued and a subsequent charge of tar introduced and distilled. In the continuous operation, the introduction of fresh tar will be regulated and the withdrawal of the residue will be regulated so as to produce a distillate oil and residue of the desired characteristics. Instead of atomizing or spraying the tar through spray nozzles or similar devices, agitating means may be provided in the body of the tar for atomizing and spraying it into the vapor space of the still; or other suitable means may be provided for bringing about the desired intimacy of contact of the tar to be distilled with the hot gases.

The atomizing or spraying of tar into the hot gases, and particularly into a flowing stream of the hot gases, results in more or less entrainment of heavier tar particles and oils in the gases passing through the still. The hot coke oven gases may themselves still contain entrained tar constituents which, unless removed, would tend to contaminate the oils subsequently condensed. Such entrainment can advantageously be prevented by subjecting the admixed gases and vapors passing from the still to the action of an electrical precipitator which will cause precipitation of entrained solid and liquid particles, leaving substantially only gases and vapors to pass to the condensing system. By interposing an electrical precipitator so that it cleans the gases as they leave the still, there is produced a mixture of clean gases and vapors still at a high temperature from which clean oils can be subsequently condensed. Moreover, the cleaning of the gases and vapors in this way immediately after they leave the still enables the separated liquid constituents to be returned or refluxed back to the still for further distillation, thus insuring that all of the tar constituents of the tar distillate, and also of the hot coke oven gases employed for the distillation, will be recovered either as a pitch-like residue or residues from the still or as clean oils in the subsequent condensing system. In this way, the tar can be distilled to produce pitch of the desired melting point and to give distillate oils of varying characteristics which are clean in the sense that they are free from contaminating tar or pitch and which may have varying characteristics as to boiling point, etc., depending upon the method employed for their recovery.

The invention is of more or less general application to the distillation of tars, tar oils, etc. At coke oven plants, the tar recovered for distillation will be coal tar separated from the coke oven gases. Other tars, such as gas-house tar (horizontal, vertical or inclined retorts) water-gas tar, etc., can similarly be distilled. By mixing different kinds of tars, for example, coal tar and gas-house tar, or coal tar and water-gas tar, composite pitch residues can be produced and composite distillates. The invention is applicable not only to tar distillation, but also to tar dehydration, since by limiting the extent to which the distillation is carried, the tar may be merely dehydrated and freed from only a relatively small percent of its light oils, to give a dehydrated tar which may be desired for certain purposes. The tar does not need to be preliminarily dehydrated before subjecting it to distillation, according to the present process, since coal tar admixed with more or less water can be subjected to distillation and during its progressive heating by the hot coke oven gases will be first heated and dehydrated and subsequently distilled to the desired extent.

The invention is also applicable to the distillation of oils, particularly oils recovered from coal distillation systems. Dirty oils, or oils contaminated with more or less tar, can be readily distilled and converted into distillate oils free or relatively free from tar with recovery of the tar in the form of a heavy tar or pitch residue. By carrying out such distillation and cleaning the vapors and gases from the distillation with an electrical precipitator before their temperature has fallen to any considerable extent, only clean oils will be subsequently condensed, and all of the heavy tar constituents will be separated and recovered as a separate product or products of the process. Composite oils containing oils of different boiling points can be fractionally separated, e. g. by fractional condensation from the gases after they leave the still and electrical precipitator. The tar or pitch thrown down by the electrical precipitator may be kept separate or refluxed or otherwise returned to the still.

Where a part only of the hot coke oven gases from a battery are employed for tar distillation, according to the present invention, the remainder may be collected in the ordinary way in the collector main and the tar and tar constituents recovered therefrom in the collector main and in the cooling or condensing system.

Where the distillate oils produced from the tar distillation are not desired as separate products, the gases and vapors from the distillation may pass to the ordinary condensing system of the battery and the condensable constituents recovered therefrom simultaneously with the recovery of the constituents from the gases from the rest of the battery. That is, the same condensing system may be employed for condensing the distillate oils from the tar distillation that is employed for recovering condensable constituents from the coke oven gases from the rest of the battery.

It is advantageous, however, to provide the tar still with its own separate condensing system so that the distillate oils may be kept separate, particularly as these oils will be relatively clean oils even without further scrubbing or cleaning. By subjecting them to further scrubbing or cleaning when necessary, e. g., by treating them with an electrical precipitator at a high temperature, they can be recovered as clean oils free or substantially free from heavy tar constituents. Moreover, by carrying out the distillation at a high temperature and cleaning the gases by an electrical precipitator at a high temperature, the heavy oils can be kept in vapor form and subsequently recovered as a part of the distillate; and, where the recovery is by fractional condensation, the heavy oils can be recovered more or less separate from the lighter oils and these in turn can be recovered in the form of fractions of different boiling points or boiling point ranges.

Where the coke oven gases are passed through a series of stills and subjected to repeated scrubbing with tar to be distilled thereby, the resulting admixed gases and vapors may be sufficiently clean to give oils sufficiently clean for use without further treatment. If further cleaning is desired, this can be effected, for example, by the use of an electrical precipitator at high temperatures or by further cleaning the gases by scrubbing with tar or heavy oils which may if desired effect a further distillation of the tar or oil used for scrubbing and the further purification of the gases from heavier tar constituents. Where a series of stills are employed, different materials may be distilled in them, for example, tar in the first, oil in the second etc.

The invention is particularly advantageous for distilling coal tar, or admixtures of coal tar and other tar, at a coke oven battery. It is also applicable in conjunction with other coal distillation plants where hot distillation gases are produced, for example, gas retort plants where the hot gases from the retorts may be employed for carrying out the distillation and where gas-house tar or admixtures of gas-house tar with coal tar or other tar can be distilled. The invention, moreover, is not limited to the distillation of tar, as admixtures of, for example, coal tar with petroleum oils or residues, can be distilled. Low temperature carbonization tar differs considerably from ordinary coal tar, but it can readily be distilled according to the present invention, either alone or in admixture with other tars. Water-gas tar or tar oils from various processes can be similarly distilled. The products from such distillation may be kept separate or blended to give composite products. When admixtures of tars etc. are distilled, one or more of the tars or oils may be fed to the still during distillation.

The heat content in hot coke oven gases is many times that required for distilling the amount of tar normally recovered from the coke oven gases, being around twenty to thirty-five times as much as so required. As a result, it is possible to distill many times as much tar by the gases of a single oven or battery as is produced from the gases of such oven or battery. Accordingly, the gases from a few ovens may be employed for distilling the tar from the entire battery; or the gases from a single battery may be employed for distilling the tar from many batteries or tar obtained from some other source.

From the standpoint of battery operation, a few of the ovens of the battery may be employed in the tar distillation process of the invention for distilling the tar from the rest of the battery and the dehydration of the tar may be combined with its distillation. Where tar from an outside source is available, or tar from other batteries, an increased amount of the gases from a single battery may be employed for such distillation.

The invention will be further described in connection with the accompanying drawings illustrating certain embodiments of the invention and adapted for the practice of the process of the invention, but it is intended and will be understood that the invention is illustrated thereby but is not limited thereto.

In the accompanying drawings;

Fig. 3 is a plan view showing part of a coke oven battery with a still located at the back side of the battery;

Fig. 4 is an elevation showing part of the battery and the still of Fig. 3;

Fig. 5 shows a modified form of the invention with an electrical precipitator for cleaning the gases and vapors from the still;

Fig. 6 shows a further modification with scrubbers for scrubbing the gases and vapors escaping from the still;

Fig. 7 shows a further modification with a scrubber mounted on the still;

Fig. 9 shows a series of stills;

Fig. 10 shows a modified series of stills;

Fig. 11 shows a further modified series of stills adapted for multi-stage distillation;

Fig. 15 shows another modification;

Figs. 16 and 17 show respectively an elevation and plan of a further modified construction and arrangement;

Figs. 18, 19 and 20 show further modifications;

Figs. 21 to 28 inclusive show stills with modified atomizing means; and

Figs. 29, 30 and 31 show one suitable form of electrical precipitator, these figures being respectively an elevation partly in section, a transverse section, and a plan partly in section of the precipitator.

Figure 1:
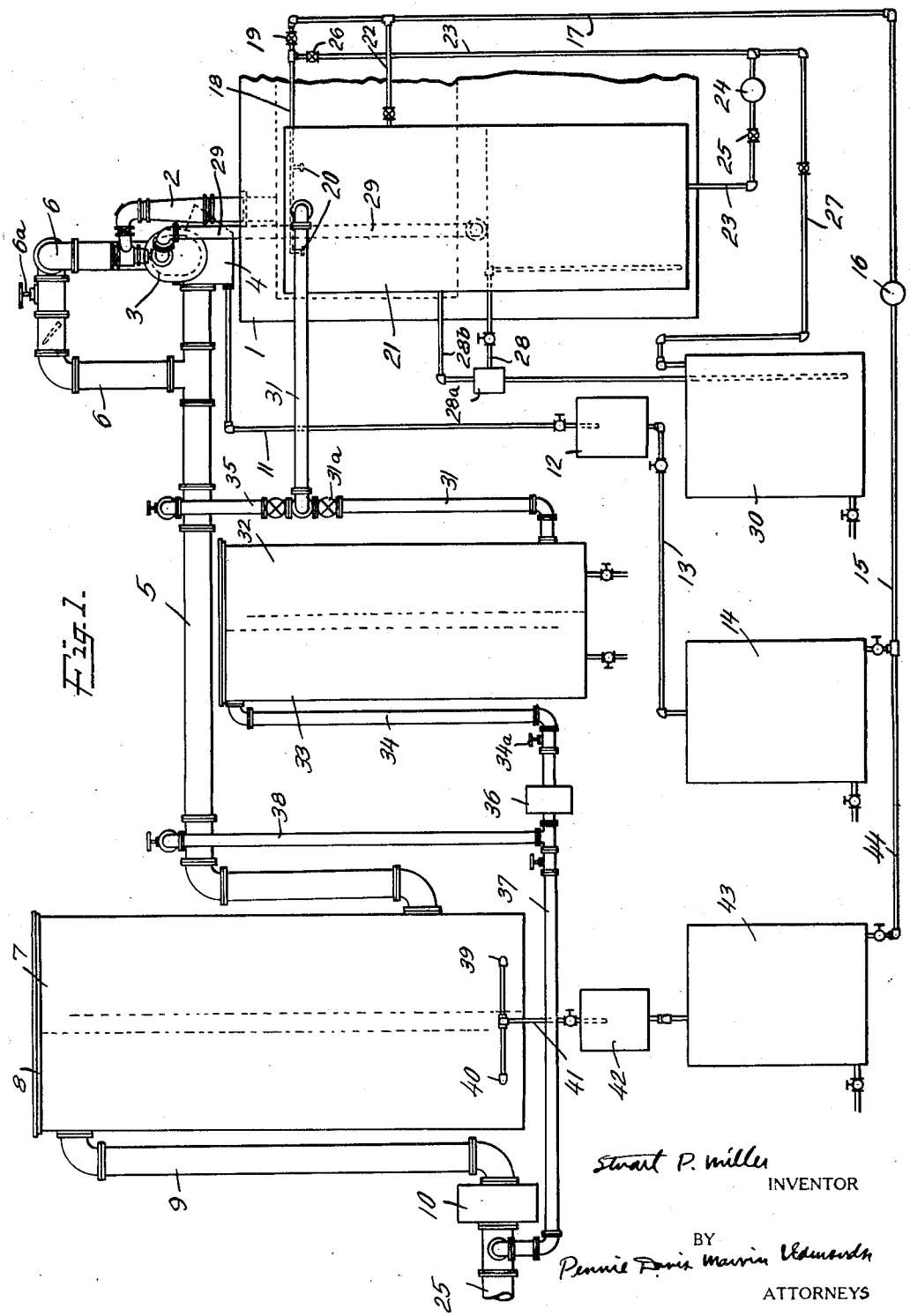
Fig. 1 shows in elevation part of one end of a coke oven battery and an arrangement of distilling apparatus embodying the invention.
Figure 2:
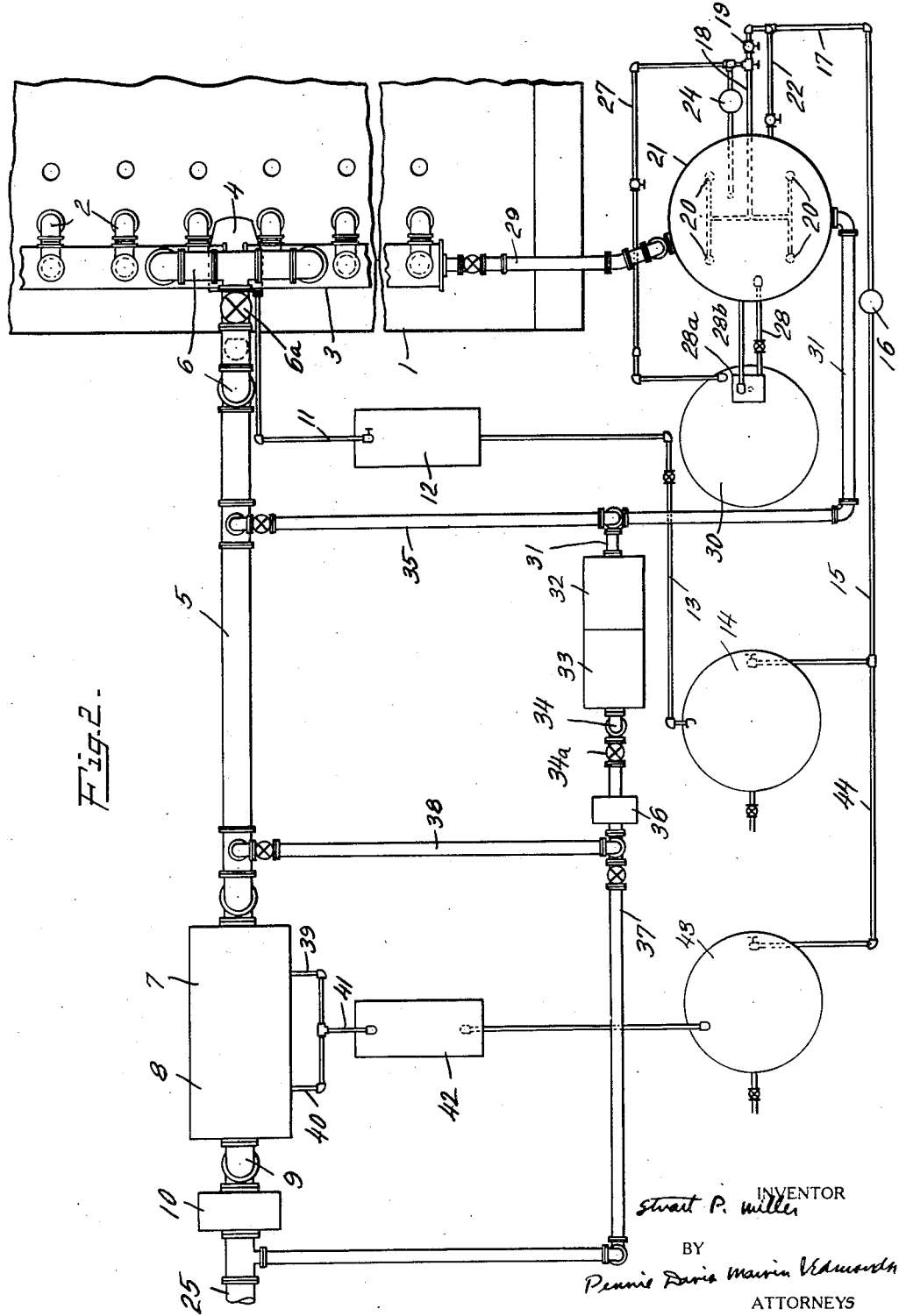
Fig. 2 is a plan view of the apparatus of Fig. 1.

Referring first to Figs. 1 and 2, part of one end of a by-product coke oven battery is indicated at 1, being provided with the usual uptake pipes 2 leading to the collector main 3, having the center box 4. The cross-over main 5 with branches 6 leads from the collector main to the condensers or coolers indicated conventionally at 7 and 8. The pipe 6 has valve 6a therein. The gas outlet pipe 9 from the cooler or condenser 8 leads to the exhauster 10 and then the gases are discharged through the pipe 25 to saturators, etc. (not shown). The system thus far described is the ordinary by-product coke oven recovery system.

The tar, or tar and liquor, collecting in the center box 4, is led through the pipe 11 having valve therein to a decanter 12, in which separation of tar from ammonia liquor may take place, and the tar is then run through the pipe 13 having valve therein to the stock tank or tar tank 14. The tar is pumped through the pipes 15, 17 and 18 by means of pump 16, to spray nozzles 20 located at the upper end of a vertical still 21 of relatively large capacity. In charging the still, the branch pipe 22 may be used, while in operation the valve in pipe 22 will be closed and the valve 19 opened. The circulating line 23 is also provided, having circulating pump 24 therein, for withdrawing tar from the bottom of the still and pumping it to the spray nozzles 20 at the top. Valves 25 and 26 in pipe 23 permit disconnecting the pump when desired. A draw-off line 27 having a valve therein leads from the bottom of the still 22 to the pitch receptacle 30. An overflow line 28 is located midway the height of the still 21 to permit a regulated overflow of tar or pitch from the still to the pitch receptacle 30. This overflow pipe extends to the bottom of the still and has a gas trap 28a therein with gas return line 28b therefrom.

A gas pipe 29 leads from one end of the collector main 3 to the still 21 at a point located somewhat above the level of tar therein this pipe having a valve therein. A gas outlet pipe 31 leads from near the upper end of the still 21 to a separate condensing system indicated at 32 and 33, the pipe 31 having valve 31a therein. The gas outlet pipe from the condensing system is indicated at 34, this pipe having valve 34a therein. A by-pass pipe 35 having valve therein is connected with the pipe 31 so as to by-pass the separate condensing system when desired. An exhauster 36 is arranged to draw the gases through the system and to discharge them either through the pipe 37 having valve therein to the gas outlet pipe 25 or through the pipe 38 having valve therein to the cross-over main 5 at a point ahead of the condenser 7.

The products condensed in the condensers or coolers 7 and 8 may be drawn off through branch pipes 39 and 40 and through the pipe 41 having valve therein to the decanter 42, and the light tar or oils can then be collected in tank 43 and passed through the pipe 44, if desired, to the line 15 leading to the still 21.

In the operation of the apparatus illustrated, the collector main, cross-over main and condensing system of the coke oven battery may be operated in much the usual way, with throwing down of heavy tar in the collector main and of light tar or oils in the condensers 7 and 8. Hot coke oven gas is drawn off from one end of the collector main 3 through the pipe 29 to the still 21, entering the still above the level of tar or pitch therein. The hot gas so withdrawn is advantageously at a high temperature, such as is obtainable by omitting the ammonia liquor or other sprays from the end of the collector main so that the hot coke oven gases will pass up through the uptake pipes 2 and into and through the collector main near one end and out through the pipe 29 at a temperature approximating that at which the gases leave the coke oven, or without any great lowering in temperature before they reach the still 21.

The still 21 is charged with a charge of tar to be distilled until the still contains a large body of tar, e. g. several thousand gallons. The charging can be effected from the stock tank 14 through the pipes 15, 17 and 22 by means of pump 16. When the still is charged, the stock tank can be disconnected, in batch operation, and the tar in the still recirculated by means of pump 24 from the bottom of the still through the circulating line and back through the spray nozzles 20 where it is atomized or sprayed into the upper part of the vapor space of the still and caused to shower down through the hot coke oven gases passing therethrough. This results in gradual heating of the tar by the hot coke oven gases until the entire charge of tar in the still has been heated to the desired temperature. Where dehydration only is desired, the charge can be circulated until it has been heated to a sufficiently high temperature to remove all or substantially all of the water therefrom, together with such incidental amounts of light oils as may be removed simultaneously. Where the tar is to be further distilled, the circulation is continued and the temperature of the tar gradually raised until the tar has been distilled to the desired extent, leaving a residue in the still of heavy tar or pitch of the desired melting point. The charge of pitch or heavy tar can then be drawn off through the line 27 and to the storage tank 30.

The hot coke oven gases are drawn through the vapor space of the still and after being brought into contact with the tar being showered therethrough pass out through the pipe 31 and either through the by-pass pipe 35 and the cross-over main 5 to the main condensing system 7 and 8, or through valve 31a to the separate condensing system 32 and 33 after which the gases pass through the pipes 34 and 37 to the gas outlet pipe 25, or through pipes 34 and 38 to the main condensing system. The oils distilled from the tar by the hot gases, together with entrained tar or pitch, are carried along with the gases and either separately condensed in the condensers 32 and 33, or carried over and condensed in the main condensing system 7 and 8.

In the operation described, the tar distilled is that produced by the coke oven battery, but the distilling capacity of the amount of hot coke oven gases available is so great that only a small amount of the hot coke oven gases is required for distilling the tar produced by the battery. Tar from other batteries, or tar from an outside source, can be similarly discharged into the still 21 and similarly distilled to produce a heavier tar or pitch residue and distillate oils which can be separately condensed, or condensed in the condensing system of the battery.

Instead of distilling tar, tar oils or other materials can be distilled in a similar manner. For example, other tars, such as gas-house tar, water-gas tar, vertical retort tar, low temperature tar, coal tar oils, water-gas tar or other type of tar oils, low temperature tar oils, petroleum oils, etc. can be similarly distilled, utilizing the heat of the hot coke oven gases for the distillation. Instead of distilling only one material, mixtures or blends of materials may be distilled, for example, mixtures of coal tar with other tars, to give a composite distillate, and a composite pitch residue.

The operation above described is a batch operation in which the still is charged with a large amount of tar and circulated until the body of tar has been distilled to the desired extent, after which the residue from the distillation is withdrawn.

An increased amount of tar can be distilled by charging additional tar into the still during the distillation to make up for that distilled, so as to keep a substantially uniform body of tar in the still.

The operation can, moreover, be made continuous by continuously removing the residue from the still, when the distillation has progressed to the desired extent. By continuously feeding in tar at a regulated rate, and continuously removing the residue remaining from the distillation, the operation can be made continuous, with continuous production of distillate oils and of pitch residue; or the operation may be intermittent, by intermittently withdrawing part of the pitch residue, and feeding in a proper amount of raw tar, etc. to make up for the amount withdrawn.

While the still is shown without insulation, it will in practice be provided with heat insulation to prevent loss of heat by radiation, and the connecting piping, etc. will also in practice be provided with heat insulation for the same reason, although the amount of hot coke oven gas available may be such that a considerable loss of heat by radiation may take place without serious effect on the operation.

In the apparatus illustrated in Figs. 3 and 4, the coke oven battery 1a has the ordinary uptake pipes 2a, collector main 3a and cross-over main 5a, and, at the back of the battery, has four of the ovens provided with separate uptake pipes 55 and pipe connections 56 having valve 56a and spray nozzle 56b therein, leading to a large still 57 of similar construction and operation to the still illustrated in Figs. 1 and 2. The still 57 is charged in the manner above described with a charge of tar or other material to be distilled which is circulated by means of pump 58 through the circulating line 59 to the spray nozzles 60 by means of which it is atomized or sprayed into the hot coke oven gases passing through the vapor space of the still, these gases and distillate vapors passing out through the pipe 68 to the condensing system. The tar or other materials to be distilled may be supplied from the storage tank 61 by means of pump 62 through line 63 to line 59 and spray nozzles 60. The residue, in case of continuous distillation, overflows through the line 64 and pipe 65 to the pitch storage tank 66; while the residue at the end of the distillation may be withdrawn through line 67 and pipe 65 to this same receptacle.

In the arrangement illustrated in Figs. 3 and 4, several of the coke ovens (four in the apparatus illustrated) are connected by uptake pipes with the still containing the large body of tar or other material to be distilled. These coke ovens may be disconnected from the collector main 3a at the other end of the battery when the gases are withdrawn through the still for distillation purposes; while in case the still is not to be operated, or in case only part of the ovens are to be connected with the still, the ovens not so connected may be connected with the collector main and operated in the ordinary way so far as the collection of the gas therefrom is concerned. When the gases are employed for distillation, their rate of withdrawal will be regulated by suitable exhausting means (not shown). A still of the kind illustrated in Figs. 3 and 4 may replace the collector main in part, so far as the ovens connected to it are concerned, or the still may be operated as an adjunct to the collector main. The distillation of tar, etc. in the still 57 may be carried out in a similar manner to that above described in connection with the still 21 of Figs. 1 and 2; and the distillate oils can be separately condensed or condensed in the ordinary condensing system of the battery.

A steam pipe or coil 69 may, if desired, be provided in the bottom of the still 57 to assist in the distillation, or in preheating the tar, either by indirect heating, or by injecting steam directly into the body of tar.

The still of Fig. 5 is similar in construction and arrangement and operation to that of Figs. 3 and 4, but is provided with means for cleaning the distillate vapors and admixed gases escaping from the still. Similar parts in this figure are indicated by the same reference characters as in Fig. 4. Located in the outlet line 68 is an electrical precipitator shown conventionally at 70 arranged to subject the mixture of gases and vapors to the action of a high tension electrical discharge to throw down suspended liquid and solid particles from the gases and vapors passing therethrough. Tar particles carried by entrainment in the gaseous current are thus removed, as well as such condensed liquid constituents as exist in liquid form in the gases and vapors passing therethrough. The separated material may be refluxed back to the still through line 71 or passed through the line 71a to the storage tank 72 from which it may be drawn off or pumped back into the still for further distillation.

One suitable form of electrical precipitator is illustrated in Figs. 29, 30 and 31 of the drawings and is hereinafter described. This precipitator is illustrated and described in a companion application of Gregory E. McCloskey, Serial No. 167,338.

The cleaned gases and vapors pass from the electrical precipitator 70 to a series of fractional condensers or coolers 73, 74 and 75. The coolers may be of the direct or indirect type. The distillate oils condensed therein will be clean oils. By providing a plurality of coolers or condensers, a multi-stage or fractional condensation is effected so that clean oils of progressively lower boiling point can be directly recovered. When direct coolers are used the cooling may be effected by means of ammonia liquor or by scrubbing oils, and the fractional separation can be promoted by scrubbing each condenser with oil from the next succeeding stage, or by oil thrown down in the same stage. With this same arrangement of condensers, and with the provision of an electrical precipitator for cleaning the gases and vapors escaping from the still, clean oils can be directly obtained which can be marketed without redistillation, although they may be further refined, for example, by extracting tar acids therefrom with caustic alkali, etc.

In some cases, it may be desirable, as for instance in the recovery of naphthalene from the vapors, to scrub one or more stages of the condensing systems with a very heavy oil, employed as an absorbing oil, at a regulated temperature.

The product thrown down by the electrical precipitator may be in the nature of a soft pitch or heavy tar, particularly where considerable tar is carried over by entrainment in the stream of coke oven gases. This product may be kept separate as a product of the process, or returned to the still for further distillation. By continuing the distillation in the still until a heavy pitch is obtained as a residue, heavy oils will be driven off as vapors from the charge of material in the still, and these heavy oil vapors, after cleaning by the electrical precipitator, can be fractionally condensed and heavy clean distillate oils directly obtained from the process.

Where a supply of dirty oils requires distillation, these may advantageously be distilled in an apparatus such as that illustrated by charging the still with such oils and carrying out the distillation in the manner above described. By cleaning the gases electrically, clean oils can be produced as condensates, while the residue from the redistillation of such dirty oils will remain in the still as a light or heavy tar together with more or less tar scrubbed from the coke oven gases and collected in the still during the distillation. If the operation is carried out for a sufficient time, and particularly with the introduction of additional amounts of oils to be distilled during the distillation, the residue may be pitch of a greater or less degree of hardness, depending upon the extent to which the distillation is carried.

If distillate oils are desired which are not entirely clean, the electrical precipitator may not be required. For some purposes, for example, mixtures of distillate oils and coal tar are desired, and, in producing such mixtures, the presence of more or less tar condensed with the oils is unobjectionable and may even be desirable. In such cases, an apparatus such as illustrated in Figs. 3 and 4, in which the electrical precipitator is not employed, may be used. Even in such cases, however, the oils condensed will be relatively clean as compared with the light tars or tarry oils commonly recovered in the coolers or condensers from coke oven gases, because of the relatively large amount of distillate oils driven off from the tar during the distillation, and the scrubbing effect of the tar upon the coke oven gases with resulting tendency to throw down heavy tar constituents therefrom while the gases are passing through the vapor space of the still.

Instead of employing electrical precipitators for cleaning the distillate vapors and admixed gases, scrubbers may be employed, particularly where absolutely clean oils are not required. One or more such scrubbers, arranged to scrub the gases after they leave the still, will clean them to a greater or less extent. Such scrubber or scrubbers may be provided with means for circulating tar, pitch, or varying types of oil or water or ammonia liquor therethrough, depending upon the results desired. The scrubbers may be of the baffle type or of other type which will give contact between the gases and the scrubbing liquid. The gases may be scrubbed once only or several times. The temperature may be allowed to drop in each scrubber, in which case some condensation may occur, or the temperature may be maintained by scrubbing with preheated material. If the gases or scrubbing materials are sufficiently hot, additional distillation of oil can be effected. One arrangement of scrubbers is illustrated in Fig. 6. The still illustrated in this figure is similar to that of Fig. 5. The admixed gases and vapors escaping therefrom through the pipe 76 pass through the scrubber 77, thence through the pipe 81 to the scrubber 82 and then out through the line 86. A scrubbing material such as tar, pitch or oil is circulated from the tank or container 78 by means of pump 79 through a temperature regulating device 80 to the top of the scrubber. By heating or cooling the circulating material in the heat interchanger 80, the temperature may be maintained at the desired point, and either cooling and condensation as well as scrubbing obtained, or heating of the circulating material to avoid such condensation. A similar arrangement is provided for circulating tar, pitch or oil from the tank or container 83 by means of pump 84 through the heat interchanger 85 to the top of the scrubber 82. Some of the heavier constituents may be removed from the admixed gases and vapors during the scrubbing operation, depending upon the temperature maintained. The scrubbed gases and vapors pass through the line 86 to a condensing system (not shown) where condensation of relatively clean oils will take place.

In the arrangement of Fig. 7, the material in the still may be circulated through the scrubber 87 which may be followed by one or more other scrubbers (not shown) such as illustrated in Fig. 6. An additional supply of tar or oil to be distilled my be supplied from the tank 88 through the pump 89 to the scrubber and still, and some of this material may be sprayed into the top of the vapor space of the still through sprays 60. The circulating pump for circulating the material from the still to the top of the scrubber and to the top of the vapor space in the still is indicated at 90, the circulating line having an extension 91 for circulating the material to the top of the scrubber. In this arrangement the tar or pitch flowing from the bottom of the scrubber will then pass down through the vapor space of the still, while additional tar or pitch may be introduced directly into the vapor space through nozzles 60.

Figure 8:
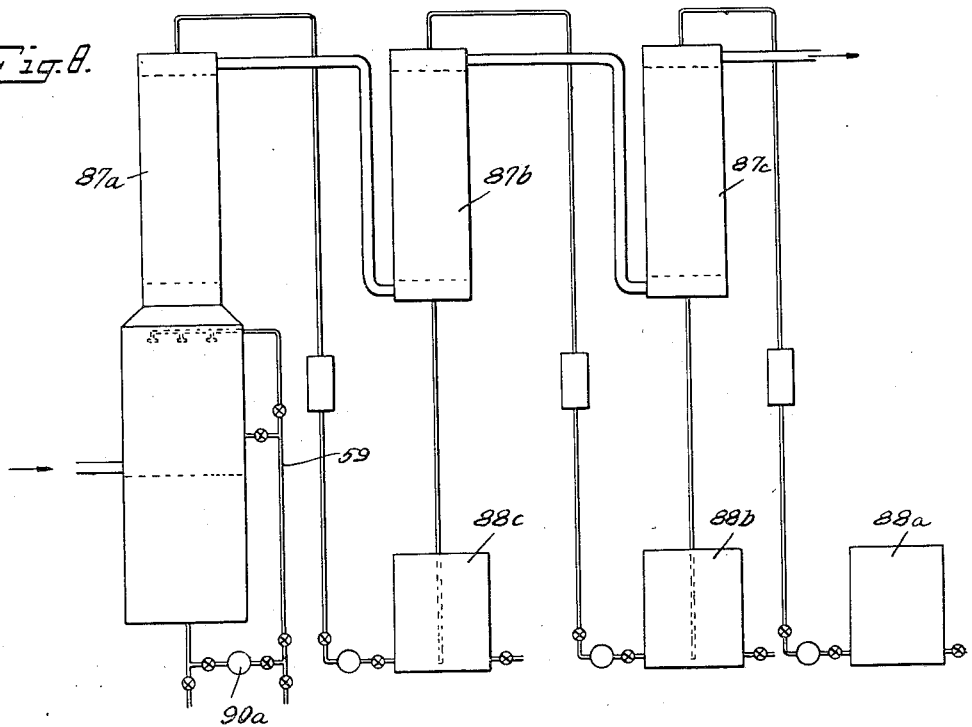
Fig. 8 shows a further modification for scrubbing the gases and vapors from the still.

A modified arrangement of scrubbers for obtaining comparatively clean distillate oils is illustrated in Fig. 8. In addition to the scrubber 87a located on top of the still, two other scrubbers 87b and 87c are arranged so that the mixture of gases and vapors pass through them in series. Oil supplied from the tank 88a is pumped to the top of the scrubber 87c, oil collected from the bottom thereof in tank 88b is pumped to the top of scrubber 87b, and oil from the scrubber 87b collected in the tank 88c is pumped to the top of the scrubber 87a. The material in the still itself is circulated by means of pump 90a from the bottom thereof and sprayed into the top of the vapor space. This arrangement provides for a counter-current scrubbing of the mixture of gases and vapors. Part of the scrubbing oil may be drawn off from the tanks 88b and 88c, in case the scrubbing removes additional oil from the gases, where the oil is itself in part distilled by the gases, additional oil may be supplied as required. Some cooling may take place during the scrubbing, or hot oil may be employed and partial distillation thereof effected simultaneously with the scrubbing so that progressively heavier oils will be obtained after the successive scrubbing operation.

In Figs. 9 and 10, a series of stills 91a, 91b, 91c and 91d are shown, each united to five ovens of a battery, so that the four stills will be united to the entire twenty ovens of a twenty oven battery and may replace the ordinary collector main and collecting system of the battery. These stills are of the same general construction as hereinbefore described, and the showing of these figures is somewhat conventional and diagrammatic. The stills 91a, 91b, 91c and 91d are arranged in series so that the tar to be distilled may be introduced into the still 91a through line 63a and circulated therein by means of line 59a and pump 58a until it has been distilled to the desired extent, then charged into the still 91b through line 64a and further distilled, and then into the stills 91c and 91d successively for further distillation until a hard pitch is produced as the product of the multi-stage distillation.

Electrical precipitators 92a, 92b, 92c and 92d are shown as located in the gas and vapor outlet lines leading from the still to the condensers 93a, 93b, 93c and 93d. Where these electrical precipitators are provided, the gases will be cleaned in the manner hereinbefore described, and only clean oils will be condensed in the condensers. Moreover, because of the progressive distillation of the tar, progressively heavier oils will be obtained in the four condensers, the lighter oils being obtained in the condensers 93a and 93b and the heavier oils in the condensers 93c and 93d. By regulating the operation, oils of varying characteristics can be directly obtained as clean oils. For example, the heaviest oil can be obtained in condenser 93d, light creosote oils in condenser 93c, acid oil in condenser 93b and light oil in condenser 93a. The condensers may also be provided with scrubbing means such as illustrated in Fig. 8. The gases passing from the condenser or scrubber 93d are shown as passing through the condenser 93c and the uncondensed gases then combined and passed through the condenser 93b and finally the gases from the entire system pass out from the condenser 93a to other condensers for recovering condensable constituents from the gases and for recovering ammonia, etc. therefrom.

The flow of gases through the system is effected, e. g. by exhausters (not shown) suitably arranged.

A further modification is illustrated in Fig. 11 in which similar stills 91e, 91f, 91g and 91h are provided for taking care of all of the gases of the battery. The gases and resulting vapors are shown as passing through a common main or pipe to a large electrical precipitator 92e and then through a series of fractional condensers 93h, 93g, 93f and 93e, in which the heavier oils and lighter oils are progressively and fractionally condensed. The gases then pass to other scrubbing or absorbing means (not shown) for recovering ammonia, etc. therefrom.

In the arrangement illustrated in Figs. 9, 10 and 11, provision may be made for circulating the tar residue or pitch forward from one still to the next, continuously or in batches, when it has reached the desired melting point, so that pitches of different melting points can be produced simultaneously from different stills. When the tar is progressively distilled in this way, it enters, for example, through the supply line 63e of Fig. 11 and the residue flows from one still to another through the lines 64e, 64f and 64g while the final pitch residue is discharged through line 64h. A separate tar supply line 63 with branches running to the separate stills permits feeding fresh tar directly to each of the stills, where this is desired either to modify the series operation or to permit each still to operate independently of the others so far as its supply and discharge lines are concerned.

Figure 12:
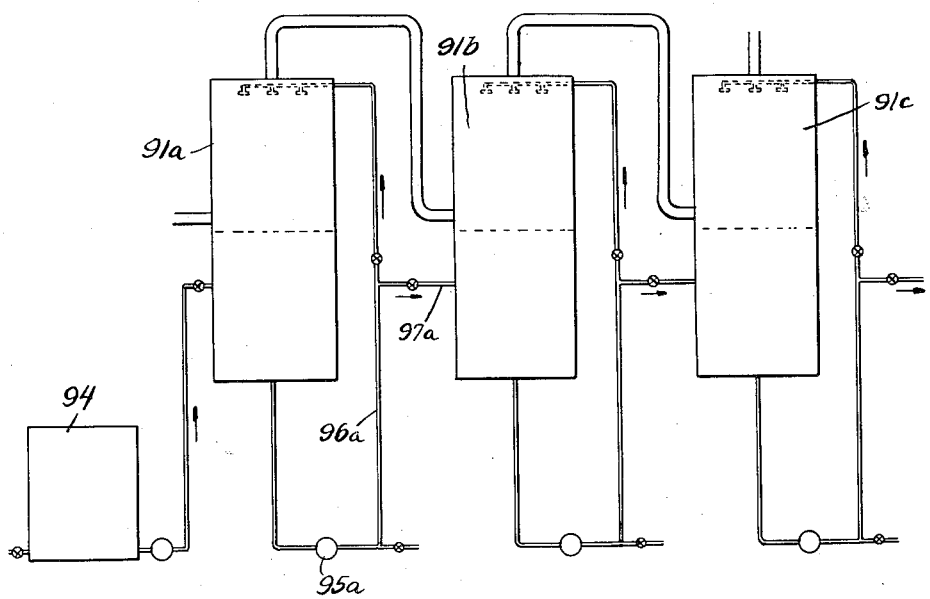
Fig. 12 shows a series of stills adapted for counter-current operation.

An arrangement for multi-stage distillation is indicated conventionally in Fig. 12 in which the tar from the supply tank 94 is charged into the first still 91a and is circulated therethrough by means of pump 95a and line 96a until the distillation has progressed to the desired extent, when part of the tar or pitch can be diverted through the pipe 97a to the second still 91b and similarly recirculated therein until further distillation has taken place after which the pitch can be transferred to the still 91c and subjected to further distillation. By regulating the valves in the connecting piping, the operation may be made continuous, with continuous discharge of some of the circulating pitch to the next still.

In multiple still arrangements, such as illustrated, whether operated in series or in parallel, the electrical precipitator may be omitted where cleaner oils are not required, or it may be substituted by scrubbing devices of various kinds to obtain a greater or less degree of scrubbing and cleaning of the gases and vapors.

In stills such as these illustrated in Figs. 9 to 12, the distillation may for one reason or another be interrupted. In such case the gases can be shut off from the stills and collected in the ordinary collector main, where the battery is also provided with such a main, and sprayed therein with ammonia liquor to cool the gases. If there is insufficient tar or oil for running all of the stills, water or ammonia liquor can be used therein for cooling purposes.

Figure 13:
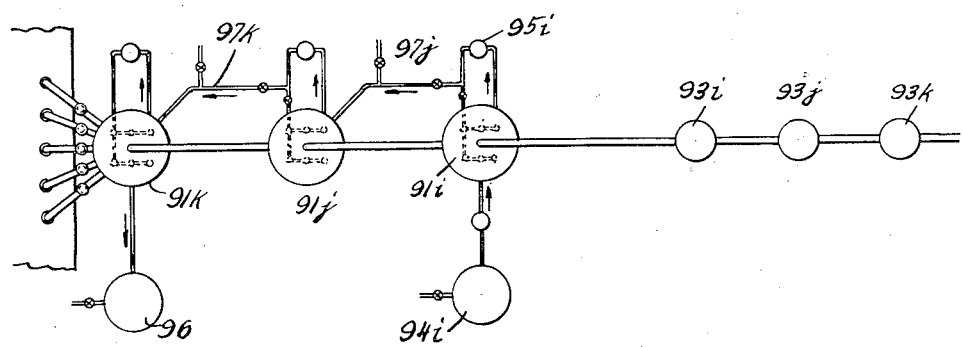
Fig. 13 shows a modified arrangement of counter-current stills.

In the arrangement shown in Fig. 13, a series of stills 91i, 91j and 91k are shown as arranged for counter-current circulation of the tar to be distilled and the hot coke oven gases. The tar from the supply or storage tank 94i is pumped into the first still 91i and circulated by means of the pump 95i. Either continuously or intermittently part of the circulating tar or pitch is transferred to the second still 91j through line 97j and there further recirculated and distilled, and the pitch finally transferred to the still 91k through line 97k where the final distillation takes place and from which the pitch residue is withdrawn into the storage tank 96. The hot coke oven gases enter first the still 91k while at their highest temperature, and serve to distill the pitch which has already been preheated and partially distilled. By this counter-current operation, the tar is progressively distilled. The heaviest distillate from the still 91k enters the vapor space of the still 91j where some condensation may take place. Similarly the vapors from the still 91j pass to the vapor space of the still 91i where some condensation of heavier vapors may also take place. The gases and vapors from the still 91i pass to the condensing system, three condensers being shown at 93i, 93j and 93k respectively. In such distillation, different qualities or melting point pitches can be obtained, one from each still.

In the stills hereinbefore described, the arrangement of the still is a vertical cylindrical arrangement. The distillation can be similarly carried out in stills of other construction, such as horizontal stills, or rectangular stills, or stills of other shape. The stills are however, adapted to contain a relatively large amount of the tar or other materials to be distilled, and are provided with circulating means for circulating the tar or pitch, etc. and for bringing it into intimate contact with the gases passing through the vapor space of the still. Such stills may be employed for the distillation of tars of various kinds, as hereinbefore described, and may be arranged to be heated by hot coke oven gas or by hot gas from other coal distillation or gasification plants, such as gas plants (horizontal, vertical or inclined retort types) hot water gas from water gas machines, gas producers, etc. Certain alternative forms of construction and arrangement of stills are illustrated in Figs. 14 to 19 inclusive.

Figure 14:
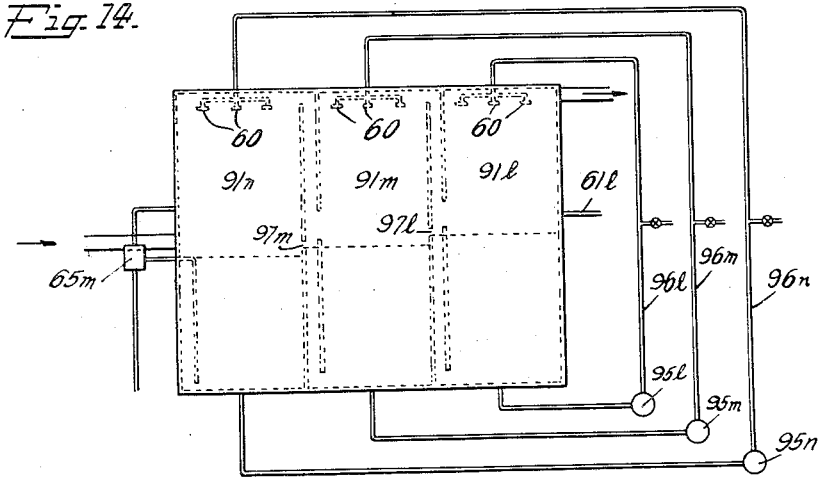
Fig. 14 shows another modified construction and arrangement of stills.

In Fig. 14 a multi-compartment still 91l, 91m and 91n is shown, with overflow outlets 97l and 97m from one compartment to the next, with circulating lines 96l, 96m and 96n and pumps 95l, 95m and 95n for circulating the tar or pitch in each compartment. A tar feed line 61l and pitch overflow line 65n provide for continuous or intermittent introduction of fresh feed and removal of residue. The operation of this compartment still is a counter-current operation, with counter-current flow of gases and liquid.

In Fig. 15 the still 100 is in the form of a tall cylindrical or rectangular tower containing a large body of oil or tar 101 in the bottom thereof which is circulated through the line 103 by the circulating pump 102 and sprayed through a series of spray nozzles 104 into the upper part of the tower. The tar or oil or pitch droplets fall through a relatively long zone of the hot gas. The hot coal distillation gases from the retorts or ovens 105 pass through uptake pipes 106 and enter the vertical still above the normal liquid level therein. The gases with distilled vapors and entrained material escape through the outlet pipe 108. These admixed gases and vapors can be treated in accordance with the methods of treatment hereinbefore described, as by cleaning with an electrical precipitator, or by scrubbing, and by fractional condensation, etc. to obtain products of the desired properties. Heavier constituents, or entrained material thrown down from the admixed gases and vapors, may be returned to the still for further distillation, in accordance with procedures such as hereinbefore described. A draw-off for the residue or pitch from the still is indicated at 110 and an overflow draw-off at 109, which is to be used in case of continuous operation. A supply line 111 with pump 112 therein enables additional tar, etc. to be distilled to be supplied during the operation.

In Figs. 16 and 17, a rectangular tank is shown located so as to allow the gases to be readily introduced. The corresponding part of the apparatus illustrated in these figures have the same reference characters as in Fig. 15 with the letter a appended thereto. The large tank still 100a is shown as located on top of the battery and connected with a plurality of ovens by uptake pipe 106a. Such a still may be located at either end of the battery, or at any intermediate point and may be used in addition to the ordinary collector main or to replace part of the ordinary collector main. It will be evident that a plurality of such stills may be employed where desired.

Figs. 18, 19 and 20 show stills somewhat similar in construction to the still of Figs. 15 and 16 but with baffles 109 and 110 therein to give a prolonged travel of the gases passing through the still and a correspondingly increased opportunity for spraying tar, etc. therein. In batch operations, the baffles may extend below the surface of the liquid but not to the bottom of the still. In case of continuous operations, with continuous introduction of tar and continuous withdrawal of pitch, the baffles may be carried to the bottom of the still, as indicated at 112c and 113c in Fig. 20. The parts of the still of Figs. 18 to 20 are indicated by the same reference numerals as in Figs. 15 to 17, but with the reference letters b or c appended thereto. With continuous operation in the still of Fig. 20, both the gases and the tar may flow around the baffles in a counter-current manner to increase the effectiveness of the distillation and to prolong the contact of the hot gases with the tar spray, and correspondingly increase the distillation. As in the case of the stills previously described, a plurality of stills may be employed, arranged either in series or in parallel, and with subsequent treatment of the admixed gases and vapors and entrained liquid, as by scrubbing, electrical precipitation, fractional condensation, etc. to recover distillate oils of the desired properties directly as products of the distillation and condensation.

In the stills previously described, the bringing of the tar, etc., into contact with the hot gases, is effected by spraying or atomizing or showering the tar, etc. into the gases in the vapor space of the still, through which the hot coal distillation gases are caused to pass. Modified forms of bringing about the desired contact are illustrated in Figs. 21 to 28 inclusive. For simplicity of illustration, the stills are shown detached from the coal distillation battery and from the condensing or gas treating system.

The stills proper, containing the large body of tar, etc. to be distilled, are indicated by the reference characters 114a to 114f, the gas inlet pipes 115a to 115f and the gas and vapor outlet pipes 116a to 116f. In Fig. 21 the tar spray line 117 is shown as entering near the bottom of the vapor space of the still and as discharging the tar spray upwardly into the vapor space of the still. In Fig. 22 rotating baffles 118 are provided, mounted on a shaft 119 driven by motor 120 and these rotating baffles are relied upon to shower the tar, etc. into the vapor space of the still to bring it into intimate contact with the hot gases passing therethrough. In Fig. 23 a centrifugal or rotary pump 121, located in the body of tar, etc. to be distilled and driven by motor 122, forces the tar, etc. through the pipe 123 and through atomizing or spray nozzles 124 arranged in the vapor space of the still.

In Fig. 24, a suitable pump 125, such as a Nash Hytor pump, draws tar, etc. through the line 126 and gas through the line 127 and discharges the resulting mixture through the line 128 and through suction T's 129 shown in Fig. 25. These suction T's are shown as located below the surface of the liquid but the discharge ends may be either above or below the liquid surface.

In Fig. 26, vertical rotating cones 130, driven by motors 131, shower the tar or other liquid up into the vapor space of the still and bring it into intimate contact with the gases passing therethrough.

In Figs. 27 and 28, rotary agitators 132 are provided, driven by motors 133, and to increase the contact of gas with the liquids these agitators are shown as provided with hollow shafts and with discharge openings 134 in the agitator blades. Compressed gas can be forced in through the hollow shaft of the agitator or gas may be drawn in from the vapor space of the still and driven out by the centrifugal force during rotation of the agitators and thereby discharged into the body of liquid and caused to pass upwardly therethrough.

The electrical precipitator 70 illustrated in Figs. 29, 30 and 31 is well adapted for use in practicing the present invention, but the invention is not limited to this particular type or construction of electrical precipitator.

The precipitator illustrated comprises a shell 140 having gas and vapor inlet 141 near the lower end thereof and gas and vapor outlet 142 near its upper end. A baffle 143 is arranged between the gas and vapor inlet and the electrode chamber 145. A plurality of tubes 146 form the positive electrodes of the separators, the shell of which is grounded. The electrodes 148 are supported by conductors 147 which are carried by bus-bars 144. Conductors 147 and 147' serve also to properly space the electrodes 148 within the tubes 146. The bus-bars at the top of the separator extend through openings 149 to the chambers 150 in which insulators 151 support the bus-bars. The openings 149 are so arranged that any liquid condensed in the chambers 150 will drain back into the body of the precipitator. Clean-out doors 152 are provided. The precipitator is also provided with temperature regulating means having inlet 153 and outlet 154 by means of which a heating or cooling medium can be circulated through the precipitator to regulate or assist in regulating its temperature.

In the operation of the apparatus, the mixture of gases and vapors enters at the bottom through the gas and vapor inlet and any heavier particles of entrained material are thrown down by the baffle 143 and collect in the chamber 155 and are drawn off therefrom through the outlet 156. The admixed gases and vapors pass upwardly through the precipitator and are subjected to the high tension discharge between the electrodes which are connected with any suitable source of high tension current. Suspended particles accumulate on the walls of the tubes and flow downwardly into the chamber 144 at the bottom of the precipitator. Liquid accumulating in this chamber can be withdrawn continuously or periodically. The mixture of gases and vapors, freed from suspended liquid and solid particles, passes from the apparatus through the outlet 142 to the condensers, etc.

The precipitator illustrated enables the admixed gases and vapors to be treated at a high temperature such that a greater or less amount of the distillate vapors are retained in a vapor state, and while the heavier suspended tar particles and heavier condensed liquid particles are removed by the electrical precipitation treatment. This treatment results in the purification of the admixed gases and vapors at a high temperature and the resulting mixture of clean gases and vapors can then be subjected to fractional condensation or otherwise treated for the recovery of clean oils therefrom and subsequently for the direct recovery of ammonia therefrom. The temperature of the electrical precipitation treatment can be regulated, both by regulating the temperature of the admixed gases and vapors flowing to the precipitator and by means of the heating jacket which the electrical precipitator has. For example, by operating the electrical precipitator at temperatures of e. g. 250° C. or 300° C. or higher, the admixed gases and vapors can be freed from suspended solid and liquid particles at such temperatures while retaining in the vapor space heavy oil vapors which can be subsequently condensed, for example, by fractional condensation, to give heavy, intermediate and light oils. If the distillation is carried out at lower temperatures such that the excess gases and vapors from the still enter the precipitator at a lower temperature, e. g. around 200° or 150° or somewhat lower, a correspondingly increased amount of the heavier oils will be separated in the precipitator and the admixed gases and vapors, after the cleaning operation, can then be cooled for the recovery of the intermediate and lighter oils therefrom. The electrical precipitator may if desired be insulated against heat loss.

For flexibility of operation, the stills of the present invention are advantageously connected to ovens which are also connected to collector means so that the gases may be collected in the collector mains in the ordinary manner when not required for tar distillation, and so that greater or less amounts of these gases can be employed for tar distillation in the stills when desired. It will be evident also that when the same ovens are connected with both the collector main or with the stills, some latitude of arrangement is permissible such that the stills may be located either at the same end of the battery as the collector main or at the opposite end. So also, the arrangement may be such that distillate oils from the stills may be carried to the same condensing system already existing at the coke oven battery, or separate condensing systems may be provided.

It will thus be seen that the invention provides for the distillation of tars of various kinds, as well as of other liquids, and the production therefrom of pitch or other residues and of distillate oils; and this distillation is effected with the heat of the hot coal distillation gases which is commonly wasted.

Stills of the character illustrated and described where the gases pass freely through the vapor space of the still and then to the condensing system, can advantageously be employed in connection with existing condensing equipment for the reason that the gases can pass through the stills with a minimum of resistance and then to the condensers and to the exhauster without any material resistance being interposed through the flow of the gases from the coal distillation system to the exhauster. Where, however, scrubbers or other resistance is introduced between the coal distillation ovens and the exhauster, provision should be made for taking care of any such resistance so as to maintain the necessary balanced pressure on the coal distillation system.

I claim:

1. The method of distilling a material of the group consisting of tar, tar oils, and pitches which comprises providing a body of the material, to be distilled in a still, passing through the vapor space of the still above the body of material therein hot coal distillation gases at a temperature sufficient to effect distillation of the material, continuously withdrawing the material from the body thereof and bringing it into intimate contact with the hot gases in the vapor space of the still, and drawing off the resulting admixed gases and vapors from the still and recovering condensable constituents therefrom.

2. The improvement in the operation of by-product coke oven batteries which comprises collecting tar from the coke oven gases from part of the battery, distilling such tar in a still by passing hot coke oven gases from another part of the battery through the vapor space of the still and repeatedly bringing the tar into intimate contact with the hot gases in the vapor space of the still whereby the tar is distilled and the distillate vapors are removed from the still along with the gases, and subjecting the resulting admixed gases and vapors to condensation to recover condensable constituents therefrom.

3. The improvement in the operation of by-product coke oven batteries which comprises cooling the coke oven gases from part of the battery to separate tar therefrom and subsequently further cooling the gases in a condensing system for the recovery of condensable oils therefrom, passing hot coke oven gases from another part of the battery through the vapor space of a tar still containing a body of tar continuously withdrawing tar from the body thereof and bringing it into intimate contact with the hot gases passing therethrough, and passing the resulting admixed gases and vapors to the condensing system previously mentioned for the recovery of condensable constituents from the combined gases.

4. The improvement in the operation of by-product coke oven batteries which comprises subjecting the hot coke oven gases from part of the battery to cooling to separate tar therefrom, transferring the tar to a tar still, passing the gases from another part of the battery through the vapor space of the tar still containing a body of the tar, continuously withdrawing tar from the body of tar, and bringing the tar into intimate contact with the gases to effect distillation thereof and passing the resulting admixed gases and vapors to a separate condensing system for the recovery of condensable constituents therefrom.

5. The method of distilling a material of the group consisting of tar, tar oils, and pitches which comprises providing a body of the material, to be distilled in a still, passing through the vapor space of the still above the body of material therein hot coal distillation gases at a temperature sufficient to effect distillation of the material, withdrawing the material from the body thereof and bringing it repeatedly into intimate contact with the hot gases in the vapor space of the still, subjecting the resulting admixed gases and vapors to scrubbing with a material of the group consisting of tar, tar oils and pitches, and subjecting the scrubbed gases and vapors to condensation to recover condensable constituents therefrom.

6. The method of distilling tar which comprises providing a body of the tar to be distilled in a still, passing through the vapor space of the still above the body of tar therein hot coal distillation gases at a temperature sufficient to effect distillation of the tar, circulating the tar and bringing it into intimate contact with the hot gases in the vapor space of the still in such manner that a large part of the volatile oils are distilled off from the tar, continuously introducing additional tar to the still during the distillation and continually withdrawing therefrom the residue of the distillation whereby the distilling operation is made continuous, and continually drawing off the admixed gases and vapors from the still and recovering condensable constituents therefrom.

7. An apparatus for the distillation of tar, comprising a still adapted to contain a body of the tar therein, a coal distillation or gasification retort or battery, means for passing the hot gases therefrom through the vapor space of the still at a sufficiently high temperature to effect distillation of the tar in the still, means for withdrawing tar from the body of tar in the still and bringing it into intimate contact with the hot gases in the vapor space of the still and a condensing system for recovering condensable constituents from the resulting admixed gases and vapors.

8. A by-product coke oven battery having a collector main and condensing system for collecting the coke oven gases from the battery and recovering tar and oil constituents therefrom, a still adapted to contain a body of tar to be distilled, means for passing hot coke oven gases from one or more ovens of the battery through the vapor space of the still at a sufficiently high temperature to effect distillation of tar therein, means for continuously withdrawing tar from the body of tar and continuously spraying it into the hot gases in the vapor space of the still, and means for recovering condensable constituents from the resulting admixed gases and vapors.

9. A by-product coke oven battery having a collector main and condensing system for collecting the coke oven gases from the battery and recovering tar and oil constituents therefrom, a still adapted to contain a body of tar to be distilled, means for passing hot coke oven gases from one or more ovens of the battery through the vapor space of the still at a sufficiently high temperature to effect distillation of tar therein, means for withdrawing tar from the body of tar and spraying it into the hot gases in the vapor space of the still, and means for recovering condensable constituents from the resulting admixed gases and vapors in admixture with condensable products from the gases collected in the collector main and condensing system of the battery.

10. A by-product coke oven battery having a collecting and condensing system for collecting the coke oven gases from the battery and recovering tar and oil constituents therefrom, a still adapted to contain a body of tar to be distilled, means for conveying tar from said system to said still, means for passing hot coke oven gases from one or more ovens of the battery through the vapor space of the still at a sufficiently high temperature to effect distillation of tar therein, means for circulating the tar and bringing it into intimate contact with the hot gases in the vapor space of the still, and means for recovering condensable constituents from the resulting admixed gases and vapors independently of the condensing system for the gases collected in the collector main.

11. An apparatus for the distillation of tar, comprising a still adapted to contain a body of the tar therein, a coal distillation or gasification retort or battery, means for passing the hot gases therefrom through the vapor space of the still at a sufficiently high temperature to effect distillation of the tar in the still, means for withdrawing tar from the body of tar in the still and spraying it into the hot gases in the vapor space of the still, means for supplying tar continuously to the still and for continuously withdrawing residue therefrom whereby the distillation is made continuous and a condensing system for recovering condensable constituents from the admixed gases and vapors escaping from the still.

12. An apparatus for the distillation of tar, comprising a still adapted to contain a body of the tar therein, a coal distillation or gasification retort or battery, means for passing hot gases from a plurality of the individual ovens or retorts into the vapor space of the still at a sufficiently high temperature to effect distillation of the tar therein, means for withdrawing tar from the body of tar in the still and spraying it into the hot gases in the vapor space of the still, and means for withdrawing and cooling the resulting admixed gases and vapors to separate condensable constituents therefrom.

13. The method of distilling tar, which comprises providing in a still a body of the tar to be distilled and a vapor space thereabove passing thru the vapor space of the still above the body of tar therein hot coal distillation gases at a temperature sufficient to effect distillation of the tar, circulating the tar and spraying it into intimate contact with the hot gases in the vapor space of the still. passing the resulting admixed gases and vapors from the still to an electrical precipitator and throwing down entrained constituents therefrom by electrical precipitation, returning the material so thrown down to the still, and subjecting the remaining admixed gases and vapors to condensation for the direct recovery of clean oils therefrom.

14. An apparatus for the distillation of tar comprising a still adapted to contain a body of the tar therein and to provide a vapor space above said body of tar, a coal distillation or gasification retort or battery, means for passing the hot gases therefrom thru the vapor space of the still at a sufficiently high temperature to effect distillation of the tar in the still, means for circulating the tar in the still and bringing it into intimate contact with the gases in the vapor space of the still, an electrical precipitator arranged to treat the admixed gases and vapors escaping from the still and having a return connection for returning separated liquid material to the still and a condensing system for recovering condensable constituents from the admixed gases and vapors passing from the electrical precipitator.

15. The method of distilling tar and of producing pitch and oils therefrom and from coal distillation gases continuously, which comprises providing in a still a large body of the tar to be distilled in admixture with pitch resulting from the distillation, passing hot coal distillation gases resulting from the distillation of coal in a number of ovens or retorts through the vapor space of the still above the body of tar and pitch therein while such gases are at a sufficiently high temperature to effect rapid distillation of the tar, continuously adding tar to the still, withdrawing a part of the tar and pitch from the body thereof and bringing it into intimate contact with the hot gases in the vapor space of the still in a sub-divided form to effect rapid distillation thereof, returning the residue from such distillation to the remaining body of tar and pitch in the still, agitating such body of tar and pitch to maintain it of approximately uniform composition throughout, drawing off pitch from the still, and drawing off the resulting admixed gases and vapors from the still and cooling them so as to recover condensable constituents therefrom.

16. The method of distilling a body of tar and of producing pitch and oils therefrom and from coal distillation gases, which comprises providing a large body of the tar to be distilled in a still, passing hot coal distillation gases from a plurality of ovens or retorts through the vapor space of the still above the body of tar therein while such gases are at a sufficiently high temperature to effect rapid distillation of the tar to pitch, withdrawing a small part of the material to be distilled from the body thereof and bringing it into the hot gases in the vapor space of the still in a sub-divided form to effect rapid distillation thereof, returning the residue from such distillation to the remaining body of the material to be distilled, agitating such body to maintain it of approximately uniform composition throughout and to effect progressive distillation thereof, drawing off the gases and vapors resulting from the distillation in the still and cooling them so as to recover condensable constituents therefrom.

17. The method of distilling tar which comprises providing a body of the tar to be distilled in a still, passing through the vapor space of the still above the body of tar therein hot coal distillation gases at a temperature sufficient to effect distillation of the tar, continuously withdrawing tar from the body thereof and bringing it into intimate contact with the hot gases in the vapor space of the still, drawing off and cleaning the resulting admixed gases and vapors to remove suspended particles therefrom, and cooling the cleaned gases and vapors to recover condensable constituents.

18. The method of distilling tar which comprises providing a body of the tar or residue from the distillation of the tar in each of a series of stills, passing through the vapor space of each still above the body of tar or tar distillation residue therein hot coal distillation gases at a temperature sufficient to effect distillation of the tar, continuously withdrawing the tar or tar distillation residue from the body thereof and bringing it into intimate contact with the hot gases in the vapor space of the still, withdrawing tar distillation residue from one still and passing it to the next still of the series whereby the tar is progressively distilled to pitch, and drawing off the gases and vapors from each still and cooling them to recover condensable constituents.

STUART PARMELEE MILLER.